US011286046B2

(12) United States Patent
Capek

(10) Patent No.: US 11,286,046 B2
(45) Date of Patent: Mar. 29, 2022

(54) PAYLOAD LIFT AND POSITIONING SYSTEM FOR AIRSHIPS

(71) Applicant: Michael J. Capek, Richmond Heights, OH (US)

(72) Inventor: Michael J. Capek, Richmond Heights, OH (US)

( * ) Notice: Subject to any disclaimer, the term of this patent is extended or adjusted under 35 U.S.C. 154(b) by 436 days.

(21) Appl. No.: 16/364,679

(22) Filed: Mar. 26, 2019

(65) Prior Publication Data
US 2019/0292025 A1 Sep. 26, 2019

Related U.S. Application Data

(60) Provisional application No. 62/648,070, filed on Mar. 26, 2018.

(51) Int. Cl.
*B64D 1/22* (2006.01)
*B66F 19/00* (2006.01)
*B64B 1/06* (2006.01)

(52) U.S. Cl.
CPC ............ *B64D 1/22* (2013.01); *B66F 19/00* (2013.01); *B64B 1/06* (2013.01)

(58) Field of Classification Search
CPC .. B64D 1/22; B64B 1/06; B66C 13/04; B66C 13/06; B66C 13/08; B66F 19/00
See application file for complete search history.

(56) References Cited

U.S. PATENT DOCUMENTS

| | | | | |
|---|---|---|---|---|
| 3,393,769 A | * | 7/1968 | Springer | E04G 3/00 182/82 |
| 3,596,968 A | * | 8/1971 | Holm | B66C 13/08 294/81.3 |
| 6,231,007 B1 | * | 5/2001 | Schafer | B64B 1/22 244/127 |
| 8,944,262 B2 | * | 2/2015 | Willim | B66C 23/185 212/273 |
| 2009/0078818 A1 | * | 3/2009 | Zulkowski | B64B 1/06 244/30 |
| 2015/0291269 A1 | * | 10/2015 | Goelet | B64B 1/58 244/30 |
| 2018/0029849 A1 | * | 2/2018 | Beer | B66C 13/08 |
| 2019/0127187 A1 | * | 5/2019 | Klapper | B66C 13/06 |

FOREIGN PATENT DOCUMENTS

| | | | | |
|---|---|---|---|---|
| DE | 4218239 C2 | * | 4/1994 | ............... B64B 1/22 |
| DE | 10058072 A1 | * | 6/2002 | ............. B66C 13/08 |

* cited by examiner

*Primary Examiner* — Richard R. Green
*Assistant Examiner* — Arfan Y. Sinaki
(74) *Attorney, Agent, or Firm* — Daniel M. Cohn; Howard M. Cohn

(57) ABSTRACT

A payload lift and positioning system mounted to an airship for precisely positioning a payload being lowered from the airship to the ground. The payload lift and positioning system includes a support beam structure mounted to an underside of the airship, the support beam structure including load hoists and guide cable hoists mounted thereto. A payload supporting structure to carry the payload, the payload supporting structure being connected to support beam structure by the load hoists and guide cable hoists. A guide cable system includes a plurality of guide cables, each extending from the guide cable hoists disposed on the support beam structure. A positioning system includes a guide member that is mounted on the payload supporting structure to control the position of the payload being lowered from the airship to ground.

18 Claims, 4 Drawing Sheets

PAYLOAD LIFT AND POSITIONING SYSTEM FOR AIRSHIPS

CROSS-REFERENCE TO RELATED APPLICATIONS

This non-provisional patent application claims the benefit of the provisional application filed with the United States Patent and Trademark Office as Application No. 62/648,070 entitled PAYLOAD LIFT AND POSITIONING SYSTEM FOR AIRSHIPS, filed Mar. 26, 2018.

FIELD OF INVENTION

The present invention relates generally to a payload lift and positioning system for airships, and, more specifically, the present invention relates to a payload lift and positioning system for airships adapted for carrying a large pay load on cables to a location on the ground below the airship.

BACKGROUND OF INVENTION

Regarding transport and lifting/dropping of large payloads, helicopters have been adapted for carrying a load on cables below it. They are preferred over blimps because of their more precise maneuverability, especially if in a wind, but if size and weight of the payload is too great, then an airship may be the only practical option for transport.

In general, when accurate positioning on the ground is required, a crane may be preferred because it is attached to the ground, but for various reasons (location, height, payload size/weight) it may not be usable and a helicopter or airship may be the only practical option. Aircraft suffer the problem of not being fixed in location relative to the ground, and all devices must deal with control of position/orientation for a load that is suspended from cable(s).

Exemplifying the prior art is U.S. 2011-0116905, (Von Kessel, et al.: METHOD AND APPARATUS FOR TRANSPORTING ELONGATED, CUMBERSOME LOADS) which has similar purpose but achieves ground-related positioning using positioners that are mounted on the ground, and they connect to the middle of the load, thereby requiring extra cabling to control rotation of the load. Combined guide/lift cables are connected to triangulated winches movably positioned on the ground, and used to control elevation of a balloon with load, and horizontal location of the lift platform/holder that is located at the center of the load can be adjusted by varying the relative tensions of the winches. Since this is connected at the load center, location of the ends (i.e., significant points of perimeter) of the load must be controlled by extra guide cables (not numbered, FIG. 6) that appear to be connected to an end of the load and manipulated by men standing on the ground.

Of more general interest is U.S. 2009-0152391 (McWhirk: MULTIBODY AIRCRANE). It describes an airship-appended "Skycrane" that incorporates a computer controlled "Robocrane" for load positioning, but does not reference the position to a guide cable anchored to ground. It is much more complicated, actively measuring speeds with Doppler radar, and distance with Laser scanner (LADAR), so that power and propulsion and actuator adjustments can be computer-determined.

Other prior art, such as load positioning systems for cranes are generally not suitable to be adapted for use with an airship, particularly when delivering a very large area load, for example a fully assembled house to be placed on a foundation. Furthermore, cranes are located on the ground. Therefore, they don't address positioning complications unique to airship supported payloads. Some examples of crane systems include: U.S. 2015/0001330 by O'Kane and U.S. Pat. No. 2,752,120 by Bogle are unsuitable because they are single lifthook systems that only position a single point, not multiple points on perimeter of a large 2D area. Bogle provides fine control only of elevation. Both appear to use manual operator controls for lateral movement of the lift hook. Control of load perimeter orientation (e.g., rotation around hook) relative to ground is not addressed.

U.S. Pat. No. 4,883,184 by Albus has multiple hooks with lift cables spaced apart by "guides" that are at fixed lateral positions, not adjustable. Albus adjusts relative elevation of the three hooks to control roll, pitch and yaw of the load platform aided by a load balancing motorized counterweight. Control of load perimeter orientation relative to ground is not addressed.

SUMMARY OF THE INVENTION

According to an embodiment of the present invention, there is disclosed a payload lift and positioning system mounted to an airship for precisely positioning a payload being lowered from the airship to the ground. The payload lift and positioning system includes a support beam structure mounted to an underside of the airship, the support beam structure including load hoists and guide cable hoists mounted thereto. A payload supporting structure to carry the payload, the payload supporting structure being connected to support beam structure by the load hoists and guide cable hoists. A guide cable system includes a plurality of guide cables, each extending from the guide cable hoists disposed on the support beam structure. A positioning system includes a guide member that is mounted on the payload supporting structure to control the position of the payload being lowered from the airship to ground.

According to a further embodiment of the present invention, there is disclosed a payload lift and positioning system mounted to an airship for precisely positioning a payload being lowered from the airship to ground. The payload lift and positioning system includes a support beam structure mounted to an underside of the airship, the support beam structure including load hoists and guide cable hoists mounted thereto. A payload supporting structure to carry the payload, the payload supporting structure being connected to support beam structure by the load hoists and guide cable hoists. A circular beam is attached to the underside of the airship to the support beam structure. A guide cable system includes a plurality of guide cables, each extending from the guide cable hoists disposed on the support beam structure. A positioning system includes a guide member that is mounted on the payload supporting structure to control the position of the payload being lowered from the airship to ground.;

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

FIG. 1 is a three-dimensional view of a payload lift and positioning system in use with an airship, in accordance with the present invention.

FIG. 2 is a side view of a payload lift and positioning system mounted to the bottom of an airship, in accordance with the present invention.

FIG. 3 is a top view of a guide member that illustrates the ability of a cable to freely move vertically through the guide member, in accordance with the present invention.

FIG. 4 is a top view of the same guide member to enable longitudinal extension from a load beam plus a lateral sweep around hinge, in accordance with the present invention.

FIG. 5 is a top view of the guide member and angular positioner attached to the sliding stage with the cable bearing directed outward from the guide member in a direction parallel to the guide member, in accordance with the present invention.

FIG. 6 is a top view of the guide member and angular positioner attached to the sliding stage with the cable bearing directed laterally from the position of the cable bearing shown in FIG. 5, in accordance with the present invention.

FIG. 7 is a top view of the guide member and angular positioner attached to the sliding stage with the cable bearing directed in the opposite direction of FIG. 6, in accordance with the present invention.

DETAILED DESCRIPTION OF THE PREFERRED EMBODIMENT

Figure 1:
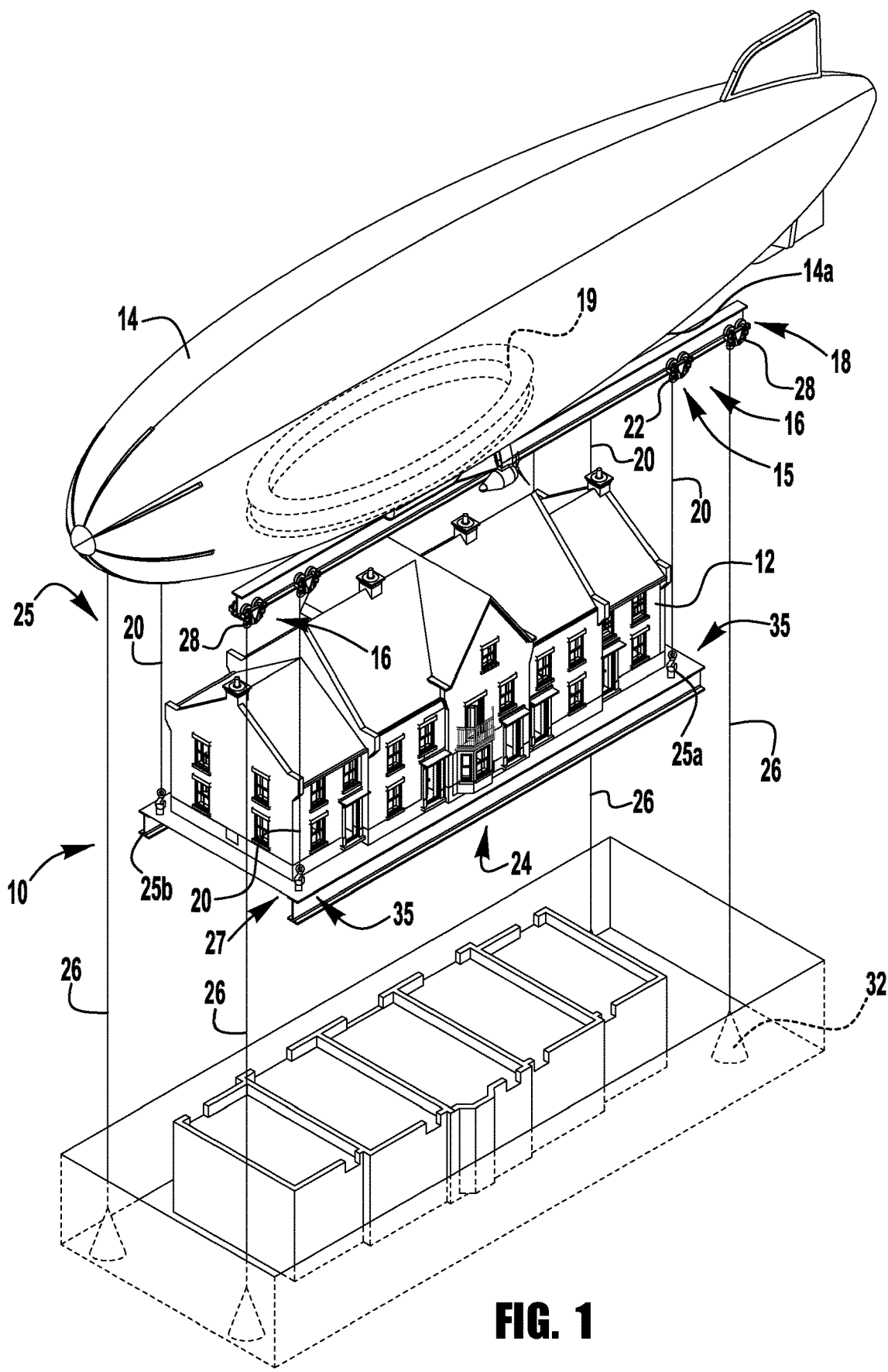
Figure 2:
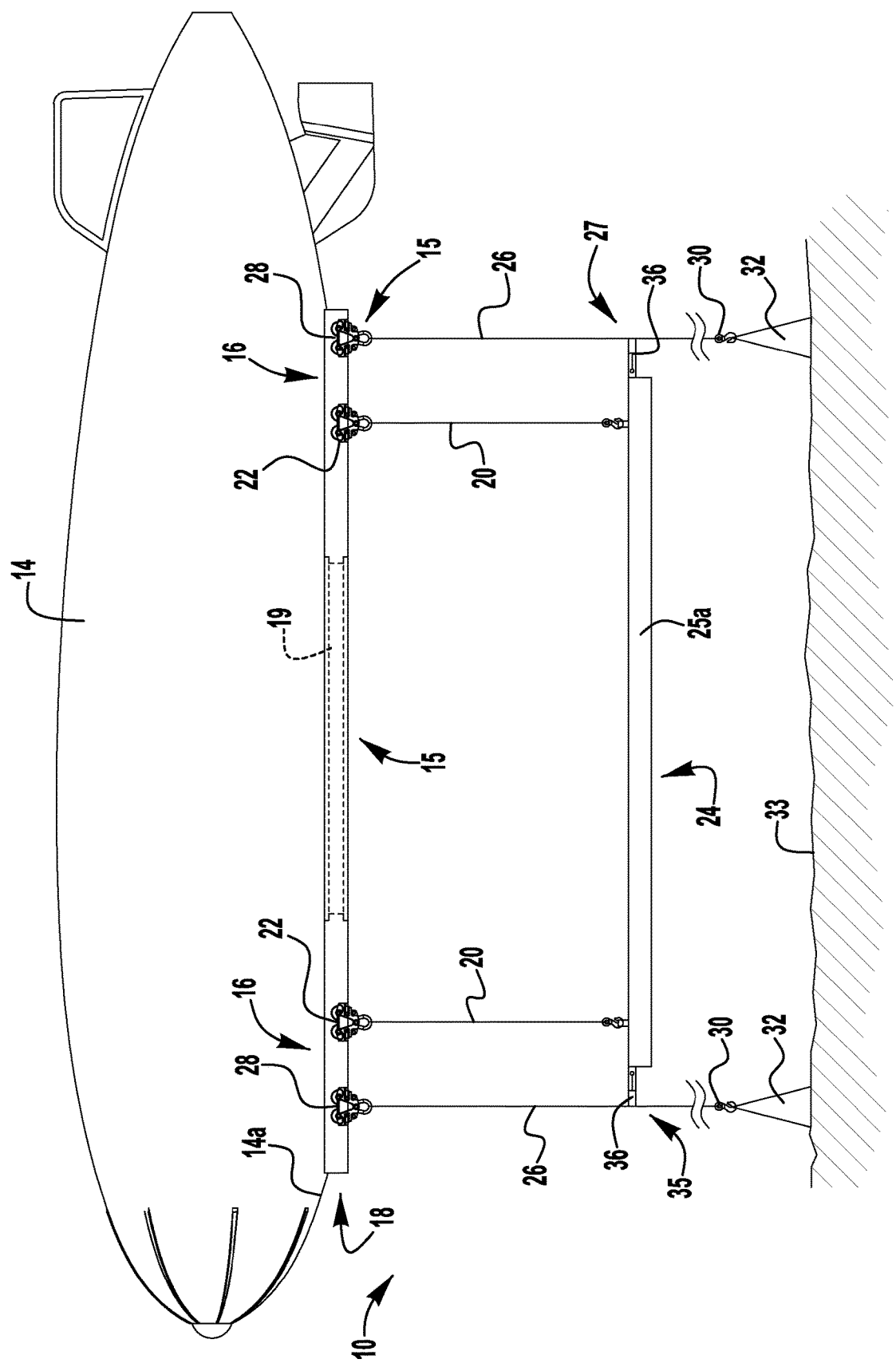

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Referring to FIG. 1, there is illustrated a payload lift and positioning system 10 mounted to a hovering airship 14. The system 10 relates to an apparatus and method for precisely positioning on the ground, the two-dimensional area (e.g., significant points of the perimeter), a payload 12 being lowered from a hovering airship 14. The hovering airship 14 may include a dirigible, blimp, balloon, and the like. The system further relates to the field of lifting, transporting, and setting of large and/or heavy payloads 12, especially payloads that are too large and/or heavy for helicopters or cranes, or for positioning by a person pulling/pushing on the payload.

The payload lift and positioning system 10 includes technology that could be adapted for similar usage with payloads of a helicopter or crane or overhead hoist, but importantly includes features that particularly meet the unique needs of an airship 14 which has very limited control of its ground-related position. For example, compared to a helicopter, an airship 14 has much less propulsion power and much greater surface area, which make it more difficult to resist re-positioning by environmental wind conditions. Unlike a helicopter, the airship is required to nose into the wind to resist it, and in stronger or variable wind conditions it must be anchored to the ground. Whereas anchoring a helicopter while in flight can be exceptionally dangerous due to interactions with the helicopter's flight apparatus that must provide lift as well as movement.

It is an object of the payload lift and positioning system 10 to provide apparatus and a method for precisely positioning on the ground, i.e., the two-dimensional area or significant points of the perimeter) a payload 12 being lowered from a hovering airship 14.

FIGS. 1-7 show elements of the payload lift and positioning system 10 and FIGS. 10-13 and to provide context by showing the system attached to an airship 14 and in use according to examples in the detailed description. A particularly suitable use of the system 10 is for positioning a complete building structure onto a foundation, as shown in FIG. 1. Generally, the payload lift and positioning system 10 includes a support and lift structure 15, a guide cable system 27, and a positioning system 35.

Referring to the overall view in FIG. 1, the payload lift and positioning system 10 generally includes a support and lift structure 15. The support and lift structure 15 includes a support beam structure 18, typically consisting of two support beams, which are mounted to the circular beam 19, or the bottom 14a of the airship 14.

Multiple electric hoists 16 are mounted to the two support beams 18. The multiple electric hoists 16 include two inside hoists that are the load hoists 22, and two outside hoists that are guide cable hoists 28. Load cables 20 extend from load hoists 22 down to a payload supporting structure 24. Preferably, the payload supporting structure 24 is a pair of load beams 25a and 25b that support the payload 12. The pair of load beams 25a and 25b are designed for simplified removal after depositing the payload 12 on a ground-based structure.

As illustrated, it is within the terms of the embodiment that an optional circular beam 19 is included to allow rotation of the airship into the wind while maintaining orientation of the load. The optional circular beam 19 is attached under the airship 14 with the pair of support beams 18. The support beams 18 are attached to the circular beam 19 and can rotate with respect thereto such that the payload lift and positioning system 10 can be rotated below the airship 14, thus maintaining a stationary orientation of the load 12 relative to the ground as the airship rotates into the wind.

The payload lift and positioning system 10 further includes a guide cable system 27. The guide cable system 27 includes a plurality of guide cables 26 that extend from guide cable hoists 28, disposed on the end of each of the pair of the support beams, down to hooks 30 that are field attachable to anchors 32 that are fixed in a desired position on the ground 33. It must be noted that that the guide cables 26 are independent and distinct from the load cables 20. The guide cable hoists 28 maintain a uniform tension on each of the guide cables 26 to keep the cables parallel to each other and to maintain a stable position of the airship 14 relative to the ground 33. This feature is unique for use with airships versus other aerial suspension, since the guide cables 26 can double as mooring cables for an airship. Note however, a guide cable 26 anchored to the ground would be dangerous for a helicopter.

Figure 3:
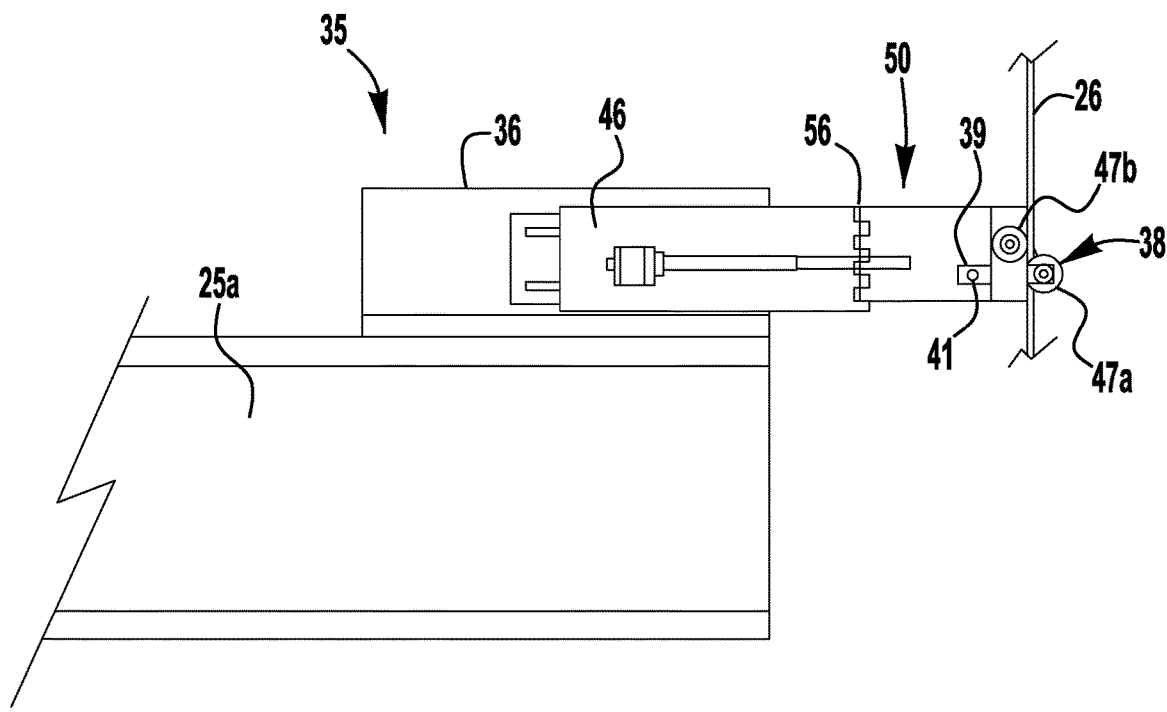

The payload lift and positioning system 10 further includes a positioning system 35. Each guide cable 26 passes through a guide member 36 that is mounted on each outer end of load beams 25a and 25b. As seen in FIG. 3, bearings 38, such as flanged rollers or other suitable means, allow each of the cables 26 to freely move vertically through the guide member 36 while maintaining a fixed lateral location relative to the guide cable 26, as seen in FIG. 3. The bearing 38 is constructed, for example, of two flanged rollers 47a and 47b positioned on either side of the cable 26. The inner roller 47a is fixed, while the outer roller 47b is removable. The outer roller 47b is mounted on support 39 which when inserted into guide member 36 is held in place by lock pin 41.

FIG. 3 further illustrates a detailed view of the positioning system 35. First, the bearing 38 of each of the guide members 36 causes each end of the load beam 25a to be lowered to the anchor 32 that is fixed in a desired position on the ground. Secondly, the positioning components of the guide member 36, including the lateral (longitudinal) positioning stage 46, an angular positioning stage 50, and the cable bearing 58, enable adjustment of lateral position of each end of the load beam 25a relative to each corresponding guide cable 26 that is fixed in position above a ground anchor 32.

Referring to FIGS. 4-7, there is shown an exemplary guide member 36 wherein two controlled extension devices 49 and 51, such as a pneumatic cylinder, a hydraulic cylinder, or a stepper motor are used to provide independent adjustment. The guide member 36 is comprised of three major components, a lateral (longitudinal) positioning stage 46, an angular positioning stage 50, and the cable bearing 58. The lateral (longitudinal) positioning stage 46 is controlled by a longitudinal positioner 48 connected at an outer end to a first end of a positioning rod 57. The opposite end of positioning rod 57 is secured to the positioning stage 46. In operation, the longitudinal positioner 48 reciprocates to enable longitudinal extension (in/out from an end of the load beam 25a) of the positioning stage 46. The angular positioning stage 50 is controlled by the angular positioner 52 connected at an outer end to a wedge shaped connector 61 secured to the angular positioning stage 50 to pivot the angular positioning stage about the hinge 56.

Figure 4:
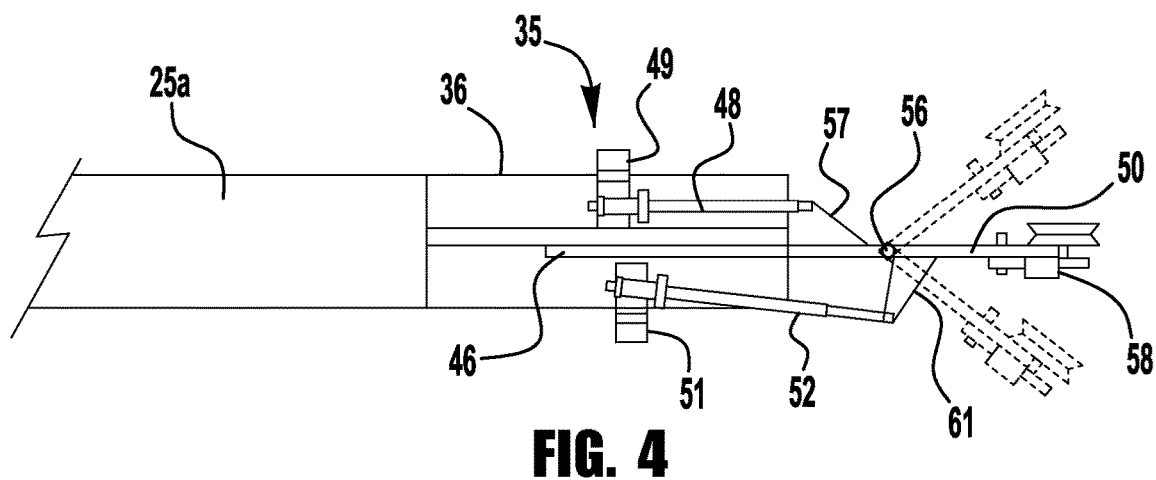
Figure 5:
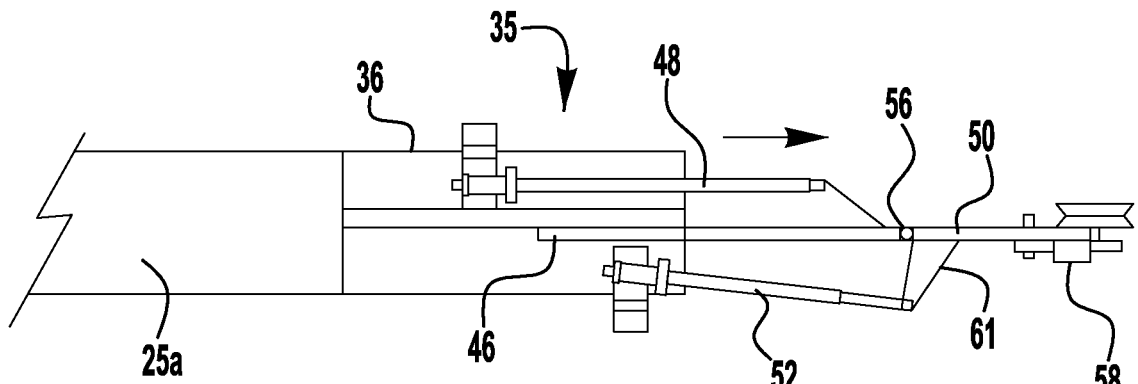
Figure 6:
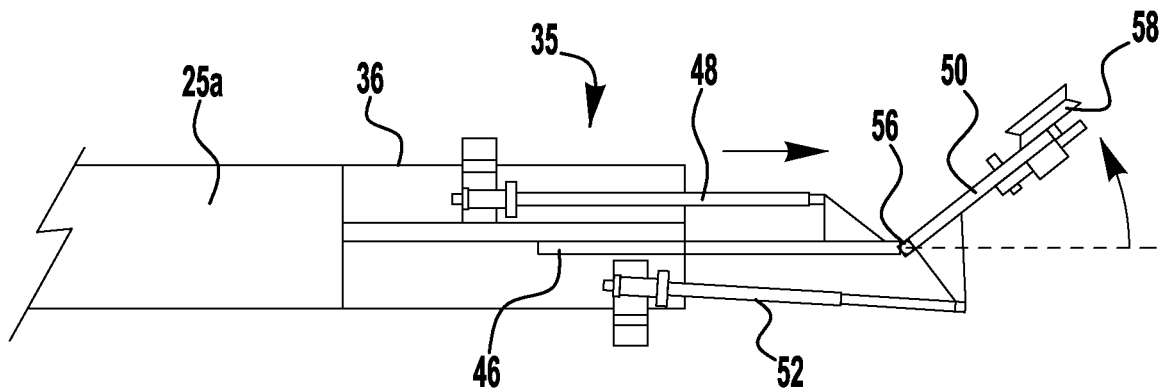
Figure 7:
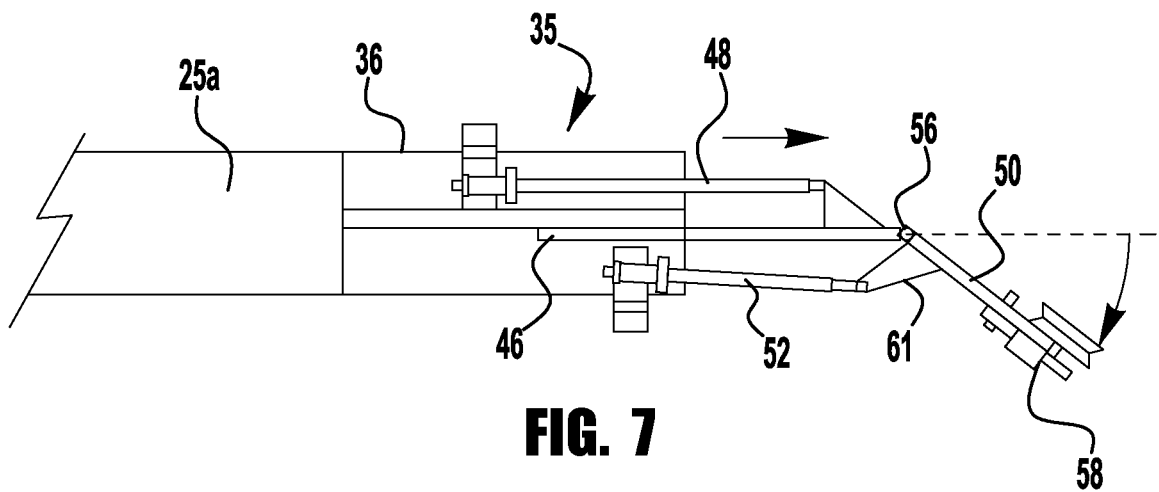

FIG. 4 illustrates the various orientations of the cable bearing 58 of the guide member 36. FIG. 5 illustrates the cable bearing 58 of the guide member directed outward from the guide member in a direction parallel to the guide member. FIG. 6 illustrates the cable bearing 58 of the guide member 36 directed upward from the position of the cable bearing. FIG. 7 illustrates the cable bearing 58 of the guide member 36 directed downward from the position of the cable bearing.

Combining extension and pivoting of the guide members 36 enables positioning of the payload 12. In the illustrated embodiment, for example, longitudinal positioner 48 and angular positioner 52 are each attached to the load beam 25a. The longitudinal positioner 48 is attached to the load beam 25a to enable pushing and/or pulling of the longitudinally sliding stage 46. The angular positioner 52 is attached to the angular positioning stage 50 by a wedge shaped 61 attached to hinge 56 and to angular positioning stage 50.

The guide member 36 includes actuators, such as positioners 48 and 52 that are connected between guide cable bearing 38 and load beam end. As such, the actuator movement will cause lateral beam end movement leveraged against the guide cable 26 that is at a ground location fixed by the ground anchor 32. Horizontal x-y adjustments can be made as needed while the payload 12 on the pair of load beams 25a and 25b is being lowered to the ground by the plurality of lift cable hoist 22. An operator in sight of the deposit point can control the adjustments. It is within the terms of the embodiment that the control implement may be a wireless or cable-attached remote control device (not shown).

The positioning members 36 may be remotely operated by one or more operators, optionally with multiple-positioner movements being coordinated by an automated control system. By way of example, a human operator with a remote control could be positioned on the ground near to each anchor 32 and could use it to fine tune the position of the payload periphery to visually align it with the desired ground location as the payload is lowered the last inches of its drop.

The positioning system 35 can operate in both coarse and fine positions. In a coarse position, the anchors 32 are prepositioned such that lowering the load beams 25a and 25b while they are constrained by the guides 36 to be aligned with the anchors will position the load close to the desired ground placement. Because they are tensioned, the guide cables 26 in the guides 36 will resist lateral swinging, rotation, and other possible destabilizing movements of the payload 12 as it is lowered to the ground. Noting that as the load cable 20 extends, the load 12 will become increasingly susceptible to such movements, an alternative that would obviate the long cable problem is to use the tensioning hoists 28 to pull the airship 14 downward, and the load 12 down with it, thus shortening the length of cables subject to ambient forces thereby minimizing undesirable payload movements.

In a fine position the guides 36 are configured as positioning members for fine adjustment of the load beam 24 (and load) position relative to the "coarse" position established by the anchor 32 placement. This enables precise ground placement of the load such as may be needed for alignment of a large footprint structure onto a pre-constructed foundation wall, and accommodates challenging environmental circumstances such as variable wind.

The anchors 32 are prepositioned such that lowering the load beams 25a and 25b while they are constrained by the guides 36 to be aligned with the anchors will position the load 12 close to the desired ground placement. Because they are tensioned, the guide cables 26 in the guides 36 will resist swinging, rotation, and other possible destabilizing movements of the payload as it is lowered to the ground.

Although airships with lift systems may be advantageously utilized for transporting and delivering very large loads such as railroad cars, boats, windmill blades and the like, the inventive positioning system 10 expands the range of potential applications to large and/or heavy loads that must be lowered to relatively precise locations. A prime example is a building structure (e.g., house, restaurant, bridge section, entire level of a skyscraper, etc.), that is to be deposited on a foundation/support structure. Example use of the payload lift and positioning system 10 for a house is now detailed:

A full size house is constructed in a factory on two load beams 25a and 25b themselves resting on one (or two parallel) railcar(s) (not shown). Once complete, the car is rolled out of the factory. Concurrent with factory construction, a basement or crawlspace foundation and walls is excavated and constructed at the home site, with two notches in the end wall(s) that will allow clearance for the lift beams. While the foundation is being poured (concrete) anchors 32 are poured a preset distance from the basement walls. The anchors 32 will have attachment points for the guide cables 26.

Factory pre-building of the house has advantages such as: 1) Factory setting provides uniform temperature and lighting around the clock. 2) Constant supply of compressed air and electricity for tool use. 3) Construction can be completed on all three shifts. 4) Overhead cranes can transport material to second floor or the roof. 5) All materials delivered to the same site and common items (studs, drywall, plywood, etc.) can be stocked for constant supply. 6) Variety of designs & options would likely be limited to minimize cost.

Once the house is completed, the railcar(s) is rolled outside the factory to anchor locations 32 in the yard. An airship 14 with the described lift system 10 is positioned overhead, the guide cables 26 lowered and attached to the anchor points 32. The guide cables 26 are tensioned sufficiently to guide the load 12 during windy conditions and preventing excessive movement.

Once the guide cables 26 are tensioned, the load cables 20 are lowered and attached to the load beams 25a and 25b. The load beams 25a and 25b and load 12 are hoisted up and when safely clear of any nearby hazards, the tension is removed from the guide cables 26 until they can be unhooked and then raised as well.

The airship 14 then transports the load 12 to site. The airship may be configured with a cowling and/or stabilizer structure to protect the suspended load during flight. At the site, the guide cables 26 are lowered and attached to the anchors 32 that were formed with the foundation. Once tensioned, the load 12 is lowered until the main frame of the house rests on the foundation. If needed, the circular beam 19 allows the airship 14 to turn into the wind while maintaining load position to minimize buffeting from the wind. While lowering, the guides 36 are manipulated to precisely locate the house onto the foundation. The two load beams 25a and 25b are then detached from the house frame, one set of lift cables detached, and then the load beams are slid out one end of the basement. The lift cables 20 are re-attached to the beam and it is lifted back up along with all the guide cables 26. The airship 14 returns to the factory while the notches in the basement walls are filled in.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A payload lift and positioning system mounted to an airship for precisely positioning a payload being lowered from the airship to a ground location, comprising:
   a support beam structure mounted beneath the airship, the support beam structure including load hoists and guide cable hoists mounted thereto;
   a payload supporting structure to carry the payload; the payload supporting structure being connected to the support beam structure by the load hoists and the guide cable hoists;
   a circular beam attached under the airship with the support beam structure such that the payload lift and positioning system can be rotated below the airship to maintain a stationary orientation of the payload relative to the ground location as the airship rotates into wind;
   a guide cable system including a plurality of guide cables, each extending from the guide cable hoists disposed on the support beam structure; and
   a positioning system including a guide member that is mounted on the payload supporting structure to maintain a stationary orientation of the payload being lowered from the airship relative to the ground location.

2. The payload lift and positioning system of claim 1, wherein the support beam structure is comprised of two support beams.

3. The payload lift and positioning system of claim 2, wherein the payload supporting structure includes two load beams that support the payload.

4. The payload lift and positioning system of claim 3, further including load cables that extend from the load hoists down to the payload supporting structure.

5. The payload lift and positioning system of claim 4, wherein the plurality of guide cables each extend from the guide cable hoists down to a hook that is attachable to an anchor that is disposed in a desired position at the ground location.

6. The payload lift and positioning system of claim 5, wherein each of the plurality of guide cables pass through first and second bearings that are mounted to an outside end of each load beam.

7. The payload lift and positioning system of claim 6, wherein each of the first and second bearings allows each of the plurality of guide cables to freely move vertically through the first and second bearings while maintaining a fixed lateral location relative to the guide member.

8. The payload lift and positioning system of claim 7, wherein each of the bearings is two flanged rollers positioned on opposite sides of each guide cable.

9. The payload lift and positioning system of claim 8, wherein;
   the two flanged rollers includes a fixed inner roller, and a removable outer roller; and
   the outer roller is mounted on a support held in place by a lock pin.

10. The payload lift and positioning system of claim 9, wherein the guide member includes actuators that are connected between the bearings and an end of the load beam.

11. A payload lift and positioning system mounted to an airship for precisely positioning a payload being lowered from the airship to a ground location, comprising:
    a support beam structure mounted beneath the airship, the support beam structure including load hoists and guide cable hoists mounted thereto;

a payload supporting structure to carry the payload, the payload supporting structure being connected to the support beam structure by the load hoists and the guide cable hoists;

a circular beam attached to the underside of the airship with the support beam structure such that the payload lift and positioning system can be rotated below the airship to maintain a stationary orientation of the load relative to the ground location as the airship rotates into wind;

the support beam structure is comprised of two support beams;

a guide cable system including a plurality of guide cables, each extending from the guide cable hoists disposed on the support beam structure; and a positioning system including a guide member that k mounted on the payload supporting structure to maintain a stationary orientation of the payload being lowered from the airship relative to the ground location.

12. The payload lift and positioning system of claim 11, wherein the payload supporting structure includes two load beams that support the payload.

13. The payload lift and positioning system of claim 12, further including load cables that extend from the load hoists down to the payload supporting structure.

14. The payload lift and positioning system of claim 13, wherein:

each of the plurality of guide cables extend from the guide cable hoists down to a hook that is attachable to an anchor that is disposed in a desired position at the ground location; and each of the plurality of guide cables pass through first and second bearings that are mounted to an outside end of each load beam.

15. The payload lift and positioning system of claim 14, wherein each of the first and second Barings allows each of the plurality of guide cables to freely move vertically through the first and second bearings while maintaining a fixed lateral location relative to the guide member.

16. The payload lift and positioning system of claim 15, wherein each of the bearings is two flanged rollers positioned on opposite sides of each guide cable.

17. The payload lift and positioning system of claim 16, wherein;

the two flanged rollers includes a fixed inner roller, and a removable outer roller; and the outer roller is mounted on a support held in place by a lock pin.

18. The payload lift and positioning system of claim 17, wherein the guide member includes actuators that are connected between the bearings and an end of the load beam.

* * * * *